(12) United States Patent
Turner

(10) Patent No.: US 6,728,309 B1
(45) Date of Patent: Apr. 27, 2004

(54) METHOD AND APPARATUS FOR HIGH SPEED DATA TRANSMISSION OVER A FOUR-WIRE SUBSCRIBER LINE

(75) Inventor: Earl Turner, Crystal Lake, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/483,440

(22) Filed: Jan. 14, 2000

(51) Int. Cl.[7] .................................................. H04B 1/38
(52) U.S. Cl. ...................... 375/222; 375/295; 375/316; 379/399.02; 379/250; 370/485; 455/73; 455/500; 455/103; 455/133; 455/334
(58) Field of Search ....................... 379/399.02, 399.01, 379/250, 242; 375/220, 222, 295, 316; 370/485, 464; 455/73, 500, 103, 132, 133, 334, 130, 39

(56) References Cited

U.S. PATENT DOCUMENTS 5,784,558 A * 7/1998 Emerson et al. ............ 709/230
6,418,176 B1 * 7/2002 Ho et al. ..................... 375/372

OTHER PUBLICATIONS

International Telecommunication Union, "*Splitterless Asymmetric Digital Subscriber Line (ADSL) Transceivers*", G.992.2, Feb. 17, 1999, pp. 3–152.
U.S. Robotics, "*An Asymmetric Modem Operating At Data Signaling Rates Of Up To 56kbit/s For Use On Certain Switched Telephone Network Telephone–Type Circuits*", Specification X2 Version 0, Feb. 10, 1997, pp. 1–47.
3Com Corporation, "*V.90 Technology*", www.3com.com, May 7, 1998, pp. 1–6.
Jerrid Hamann, "*ADSL*", www.cs.tamu.edu, Dec. 15, 1996, pp. 1–5.
ADSL Forum, "*Technical Frequently Asked Questions*", www.adsl.com, Sep. 1998, pp. 1–10.
Mike Henderson, "*56Kbps Data Transmission Across The PSTN*", Conexant Systems Inc., 1998, pp. 1–14.
Conexant Systems Inc., "*Full–Rate And G. Lite ADSL*", 1998, pp. 1–12.
International Telecommunication Union, "*A Modem Operating At Data Signaling Rates Of Up To 28800bit/s For Use On The General Switched Telephone Network And On Leased Point–To–Point 2–Wire Telephone–Type Circuits*", V.34, Sep. 1994, pp. 1–62.
International Telecommunication Union, "*Procedures For Starting Sessions Of Data Transmission Over The General Switched Telephone Network*", V.8, Sep. 1994, pp. i–11.
International Telecommunication Union, "*A Digital Modem And Analogue Modem Pair For Use On The Public Switched Telephone Network (PSTN) At Data Signaling Rates Of Up To 56000 bit/s Downstream And Up To 33600 bit/s Upstream*", V.90, May 6, 1998, pp. 1–50.
Conexant Systems, "*Quick–Connect For V.90*", Sep. 13–16, 1999, pp. 1–5.

* cited by examiner

Primary Examiner—Emmanuel Bayard
Assistant Examiner—Pankaj Kumar
(74) Attorney, Agent, or Firm—McDonnell Boehnen Hulbert & Berghoff

(57) ABSTRACT

Disclosed is an architecture and method for high speed transmission over a four-wire subscriber line. Each modem in the present invention includes a V.90 transmit section and a V.90 receive section. The V.90 transmit section is dedicated to transmitting data over one pair of a four-wire subscriber line, while the V.90 receive section is dedicated to receiving data over the other pair of the four-wire subscriber line. The present invention permits full-duplex transmission at 56 Kbps over a four-wire subscriber line.

8 Claims, 1 Drawing Sheet

METHOD AND APPARATUS FOR HIGH SPEED DATA TRANSMISSION OVER A FOUR-WIRE SUBSCRIBER LINE

FIELD OF INVENTION

The present invention relates to data communications and, more particularly, to high speed data communications over a four-wire subscriber line.

BACKGROUND OF THE INVENTION

The present invention is concerned with data communications over four-wire subscriber lines. Subscriber line communication equipment typically operates over switched two-wire connections that are limited to half-duplex or asymmetrical communication, i.e. transmission, or high-speed transmission, in only one direction at a time between endpoints of the connection. Full-duplex transmission, i.e. simultaneous transmission in both directions between endpoints, is possible using four-wire subscribe lines. Four-wire subscriber lines, also known as private leased lines (PLLs), are non-switched lines through the public telephone network that are typically leased by an end user, or subscriber, for a dedicated communication link between two endpoints. Each four-wire subscriber line is composed of two pairs of conductors, one pair for each direction of communication. A modem adapted for use with four-wire lines terminates each end of the communications link.

FIG. 1 is an architecture diagram illustrating an example of a conventional four-wire communications link 10 between a subscriber's end points. Modems 22 and 42 are customer premises equipment (CPE) located at the customer's facilities and connected to the customer's data termination equipment (DTE) devices 20 and 40, respectively. A four-wire subscriber line connects modems 22 and 42 through the PSTN. A first pair of lines 32A and 32B provides the transmit pair from transmit terminals (TX) for modem 22 to receive terminals RX for modem 42. Similarly, a second pair of lines 34A and 34B provides the transmit pair from transmit terminals (TX) of modem 42 to receive terminals (RX) of modem 22.

Modems 22 and 42 are data communications equipment (DCE) and have a series of lines for interfacing with their respective DTE devices. In the example of FIG. 1, the lines are specified by the RS-232C/V.24 standard. A transmit data (TD) line of each modem receives data from a data output terminal of the corresponding DTE for transmission to the modem at the other end of the communications link. Likewise, data received by each modem over the communications link is output to a data input terminal of the corresponding DTE over the receive data (RD) line. A data transmit control terminal of the DTE is connected to a request-to-send (RTS) line of the modem and signals the modem that the DTE is about to send data to the modem over the TD line. For example, when modem 22 receives an active signal from DTE device 20 connected to its RTS line, modem 22 transmits a carrier signal to modem 42 over a first pair of lines 32A and 32B. Once the connection with the modem 42 is established, modem 22 will modulate the carrier signal on the first pair of lines 32A and 32B with data received from DTE device 20 on the TD line of modem 22. Modem 42 receives the modulated signal transmitted on the first pair of lines 32A and 32B, demodulates the received signal to obtain the data signal, and outputs the received data over its RD line to DTE device 40.

Likewise, when modem 22 senses a carrier signal transmitted on a second pair of lines 34A and 34B, it activates a carrier detect (CD), line connected to a data input control terminal of DTE device 20. Modem 22 demodulates the signal received over the second pair of lines 34A and 34B to obtain the data signal from modem,42 and outputs the received data over its RD line connected to a data input terminal of DTE device 20.

Some transmission protocols, such as the International Telephone Union (ITU) V.34 standard, are configured to accommodate full-duplex transmission, i.e. simultaneous transmission in both directions, over a four-wire subscriber line. However, the maximum data rate for V.34 is limited to 33.6 kilobits-per-second (Kbps). Many higher speed protocols, such as the V.90 standard, which is capable of a 56 Kbps transmission rate, are not configured to accommodate full-duplex transmission.

Therefore, the need remains for an approach that provides for high speed transmission over a four-wire subscriber line.

SUMMARY OF THE INVENTION

In accordance with preferred embodiments of the present invention, some of the problems associated with data transmission over four-wire subscriber lines in the prior art are overcome.

An embodiment of a communication system for transmitting data over a four-wire subscriber line, according to the present invention, includes a first data terminal device having a data output control terminal, a data output terminal, a data input control terminal and a data input terminal. The system also includes a first modem having a receive section and a transmit section. The receive section of the first modem has first and second line input terminals for coupling to a first pair of wires of the four-wire subscriber line, a receive control output terminal coupled to the data input control terminal of the first data terminal device for outputting a signal to the first data terminal device when a first encoded data signal is present on the first pair of wires, and a receive data output terminal coupled to the data input terminal of the first data terminal device. The receive section of the first modem is configured to decode the first encoded data signal present on the first pair of wires according to a predetermined data transmission protocol in order to generate a first unencoded data signal at the receive data output terminal. The transmit section of the first modem has first and second line output terminals for coupling to a second pair of wires of the four-wire subscriber line, a transmit control input terminal coupled to the data output control terminal of the first data terminal device for receiving a signal from the first data terminal device that the first data terminal device is going to output a second unencoded data signal on the data output terminal of the first data terminal device, and a transmit data output terminal coupled to the data output terminal of the first data terminal device. The transmit section is configured to encode the second unencoded data signal received on the transmit data output terminal according to the predetermined data transmission protocol in order to transmit a second encoded data signal on the second pair of wires.

An embodiment of a method for high-speed full-duplex communication over a four-wire subscriber line, according to the present invention, provides for receiving a first unencoded data signal from a first data terminal device, encoding the first unencoded data signal according to a predetermined data transmission protocol to obtain a first encoded data signal, and transmitting the first encoded data signal over a first pair of wires of the four-wire subscriber line. The method also calls for simultaneously receiving a second encoded data signal over a second pair of wires of the four-wire subscriber line, decoding the second encoded data signal according to the predetermined data transmission protocol to obtain a second data signal, and outputting the second data signal to the first data terminal device.

The foregoing and other features and advantages of the present invention will be more readily apparent from the following detailed description of an embodiment of the present invention, which proceeds with references to the accompanying drawings.

BRIEF DESCRIPTION OF THE DRAWINGS

Particular embodiments of the present invention are described below with reference to the following drawings, wherein.

Note that elements that are related to one another in the drawings are identified using the same or similar reference numbers.

DETAILED DESCRIPTION OF PREFERRED EMBODIMENTS

The present invention is directed toward an architecture and method for high speed data transmission over a four-wire subscriber line. The present invention, which provides for full-duplex transmission at 56 Kbps, is discussed below in the context of a V.90 based embodiment of the present invention.

Figure 1:
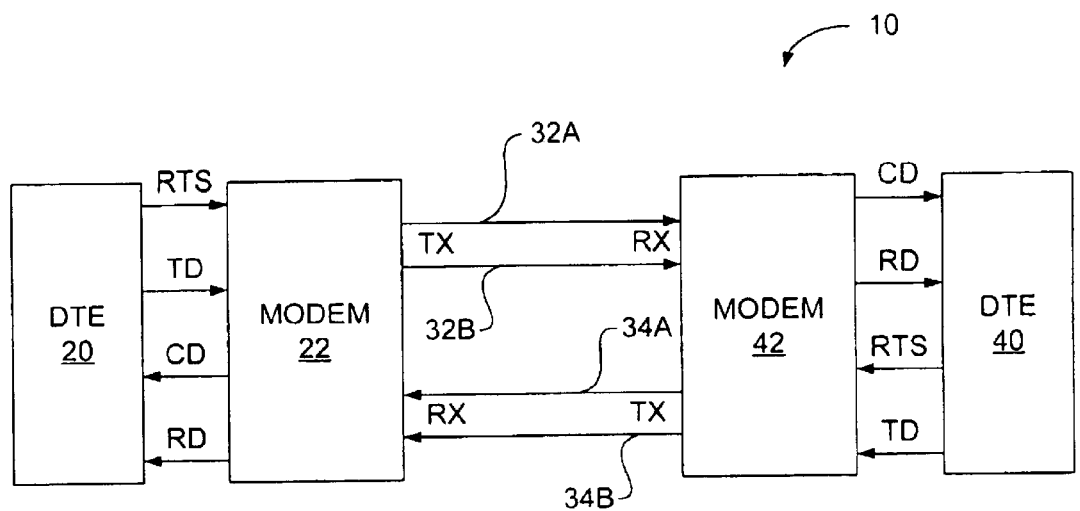
FIG. 1 is a block diagram illustrating an example of a conventional architecture for a communication system operating over a four-wire subscriber line.
Figure 2:
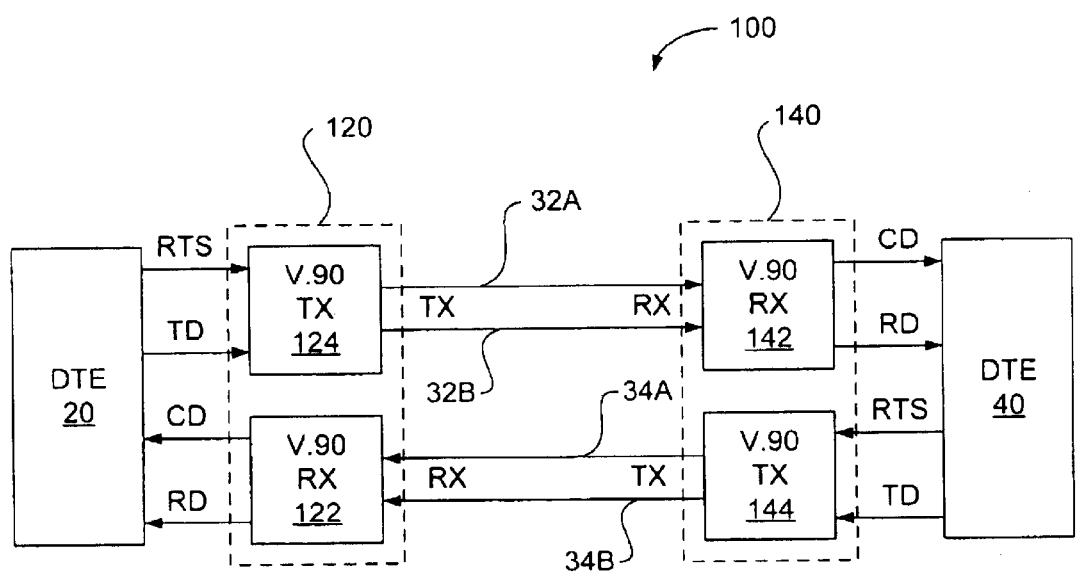
FIG. 2 is a block diagram illustrating an embodiment according to the present invention for a communication system operating over a four-wire subscriber line.

FIG. 2 illustrates an embodiment of an architecture 100, according to the present invention, that includes a pair of modems 120 and 140 connected to DTE devices 20 and 40, respectively. Modem 120 includes a V.90 transmit section 124 having a transmit control input coupled to an RTS line for modem 120 and a transmit data input coupled to a TD line for modem 120. DTE 20 drives the RTS and TD lines of modem 120 in the same manner as described above for FIG. 1. V.90 transmit section 124 has a pair of line output terminals that are coupled to a first pair of lines 32A and 32B of a four-wire subscriber line. V.90 transmit section 124 is configured to receive data from DTE 20 over the TD line for modem 120, encode the data according to the V.90 standard, and drive the encoded data onto the first pair of lines 32A and 32B.

Modem 120 also includes a V.90 receive section 122 having a pair of line input terminals coupled to a second pair of lines 34A and 34B of the four-sire subscriber line. V.90 receive section 122 has a control output terminal coupled to a CD line of modem 120 and a receive data output coupled to a RD line of modem 120. The CD and RD lines of modem 120 drive the input lines of DTE device 20 in the same manner as described above for FIG. 1. V.90 receive section 122 decodes an encoded data signal received on the second pair of lines 34A and 34B, signals DTE device 20 over the CD line of modem 120 and outputs the decoded receive data signal over the RD line to DTE device 20.

Architecture 100 includes modem 140 that is connected to DTE device 40 in a manner similar to that described for FIG. 1 above. Modem 140 includes a V.90 receive section 142 having a pair of line input terminals coupled to the first pair of lines 32A and 32B of the four-sire subscriber line. V.90 receive section 142 has a control output terminal coupled to a CD line of modem 140 and a receive data output coupled to a RD line of modem 140. The CD and RD lines of modem 140 drive the input lines of DTE device 40 in the same manner as described above for FIG. 1. V.90 receive section 142 decodes the encoded data signal from V.90 transmit section 124 of modem 120 received on the first pair of lines 32A and 32B, signals DTE device 40 over the CD line of modem 140 and outputs the decoded receive data signal over the RD line to DTE device 40.

Modem 140 includes a V.90 transmit section 144 having a transmit control input coupled to an RTS line for modem 140 and a transmit data input coupled to a TD line for modem 140. DTE 40 drives the RTS and TD lines of modem 140 in the same manner as described above for FIG. 1. V.90 transmit section 144 has a pair of line output terminals that are coupled to a first pair of lines 34A and 34B of a four-wire subscriber line. V.90 transmit section 144 is configured to receive data from DTE 40 over the TD line for modem 140, encode the data according to the V.90 standard, and drive the encoded data onto the second pair of lines 34A and 34B for transmittal to V.90 receive section 122 of modem 120.

The architecture 100 shown in FIG. 2 provides for full-duplex transmission of data over the four-wire subscriber line composed of the first pair of lines 32A and 32B and the second pair of lines 34A and 34B. Because transmission in each direction, from modem 120 to modem 140 and vice-versa, is unidirectional over each pair of lines, transmission takes place at the highest speed possible for the transmission protocol, V.90 in this embodiment. Furthermore, full-duplex transmission can be achieved even with a transmission protocol that is not configured to allow full-duplex transmission on a single pair of lines.

In view of the wide variety of embodiments to which the principles of the invention can be applied, it should be understood that the illustrated embodiments are exemplary only, and should not be taken as limiting the scope of the present invention. For example, while the embodiment shown pertains to the V.90 communication standard, other high-speed transmission protocols can be used without departing from the spirit of the present invention. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

I claim:

1. A communication system for transmitting data over a four-wire subscriber line, the system including:
    a first data terminal device, the first data terminal device having a data output control terminal, a data output terminal, a data input control terminal and a data input terminal; and
    a first modem having a receive section and a transmit section, where:
        the receive section of the first modem has first and second line input terminals for coupling to a first pair of wires of the four-wire subscriber line, a receive control output terminal coupled to the data input control terminal of the first data terminal device for outputting a signal to the first data terminal device when a first encoded data signal is present on the first pair of wires, and a receive data output terminal coupled to the data input terminal of the first data terminal device, where the receive section of the first modem is configured to decode the first encoded data signal present on the first pair of wires according to a predetermined data transmission protocol in order to generate a first unencoded data signal at the receive data output terminal, and the transmit section of the first modem has first and second line output terminals for coupling to a second pair of wires of the four-wire subscriber line, a transmit control input terminal coupled to the data output control terminal of the first data terminal device for receiving a signal from the first data terminal device that the first data terminal device is going to output a second unencoded data signal on the data output terminal of the first data terminal device, and a transmit data output terminal coupled to the data output terminal of the first data terminal device, where the transmit section is configured to encode the second unencoded data signal received on the transmit data output terminal according to the predetermined data transmission protocol in order to transmit a second encoded data signal on the second pair of wires.

2. The communication system of claim 1, the system further including:

a second data terminal device, the second data terminal device having a data output control terminal, a data output terminal, a data input control terminal and a data input terminal; and a second modem having a receive section and a transmit section, where:

the receive section of the second modem has first and second line input terminals for coupling to the second pair of wires of the four-wire subscriber line, a receive control output terminal coupled to the data input control terminal of the second data terminal device for signaling the second data terminal device when the second encoded data signal is present on the second pair of wires, and a receive data output terminal coupled to the data input terminal of the second data terminal device, where the receive section is configured to decode the second encoded data signal present on the second pair of wires according to the predetermined data transmission protocol in order to recover the second unencoded data signal for output on the receive data output terminal of the receive section of the second modem, and the transmit section of the second modem has first and second line output terminals for coupling to the first pair of wires of the four-wire subscriber line, a transmit control input terminal coupled to the data output control terminal of the second data terminal device for receiving a signal from the second data terminal device that the second data terminal device is going to output the first unencoded data signal on the data output terminal of the second data terminal device, and a transmit data output terminal coupled to the data output terminal of the second data terminal device, where the transmit section of the second modem is configured to encode the first unencoded data signal received from the transmit data output terminal of the second data terminal device according to the predetermined data transmission protocol in order to transmit the first encoded data signal on the first pair of wires.

3. The communication system of claim 2, wherein the predetermined data transmission protocol is the V.90 standard defined by the International Telephone Union.

4. The communication system of claim 1, wherein the predetermined data transmission protocol is not configured for full-duplex operation over a two-wire subscriber line.

5. The communication system of claim 4, wherein the predetermined data transmission protocol is the V.90 standard defined by the International Telephone Union.

6. A communication device for high-speed full-duplex communication over a four-wire subscriber line, the device comprising:

a receive section having first and second line input terminals for coupling to a first pair of wires of the four-wire subscriber line, a receive control output terminal for coupling to a data input control terminal of a data terminal device and configured to output a signal to the data terminal device indicating that a first encoded data signal is present on the first pair of wires, and a receive data output terminal for coupling to a data input terminal of the data terminal device, where the receive section is configured to decode the first encoded data signal present on the first pair of wires according to a predetermined data transmission protocol in order to generate a first unencoded data signal at the receive data output terminal; and a transmit section having first and second line output terminals for coupling to a second pair of wires of the four-wire subscriber line, a transmit data output terminal coupled to a data output terminal of the data terminal device for receiving a second unencoded data signal, and a transmit control input terminal for coupling to a data output control terminal of the data terminal device and configured to receive a signal from the first data terminal device indicating that the data terminal device is going to output the second unencoded data signal at the data output terminal of the data terminal device, where the transmit section is configured to encode the second unencoded data signal according to the predetermined data transmission protocol in order to transmit a second encoded data signal on the second pair of wires.

7. The device of claim 6, where the predetermined data transmission protocol is not configured for full-duplex operation over a two-wire subscriber line.

8. The device of claim 6, wherein the predetermined data transmission protocol is the V.90 standard defined by the International Telephone Union.

* * * * *